(12) United States Patent
Malcolm

(10) Patent No.: US 8,960,936 B1
(45) Date of Patent: Feb. 24, 2015

(54) BACKLIT STORYBOOK FOR THE VISUALLY IMPAIRED

(76) Inventor: Shelley A. Malcolm, Nestleton (CA)

(*) Notice: Subject to any disclaimer, the term of this patent is extended or adjusted under 35 U.S.C. 154(b) by 485 days.

(21) Appl. No.: 13/353,682

(22) Filed: Jan. 19, 2012

(51) Int. Cl.
*A47B 19/00* (2006.01)
*G09B 5/06* (2006.01)
*B42D 3/12* (2006.01)

(52) U.S. Cl.
CPC ............... *G09B 5/062* (2013.01); *B42D 3/123* (2013.01); *Y10S 345/901* (2013.01); *Y10S 362/812* (2013.01)
USPC ............... 362/98; 345/901; 362/99; 362/234; 362/602; 362/812; 434/317; 446/485

(58) Field of Classification Search
CPC ................................ G09B 5/062; B42D 3/123
USPC .............. 345/153, 176, 901; 362/98, 99, 234, 362/253, 559, 602, 604, 812; 434/317; 446/485
See application file for complete search history.

(56) References Cited

U.S. PATENT DOCUMENTS

| 4,340,372 A | 7/1982 | Brassine |
| 4,427,387 A | 1/1984 | Tomita |
| 4,600,393 A | 7/1986 | Rosenwinkel et al. |
| 4,836,783 A | 6/1989 | Harper |
| 5,484,292 A * | 1/1996 | McTaggart ...................... 362/98 |
| 6,557,284 B2 | 5/2003 | Nolan |
| 2009/0102807 A1 * | 4/2009 | Kashiwa et al. .............. 345/173 |
| 2010/0277443 A1 | 11/2010 | Yamazaki et al. |

* cited by examiner

*Primary Examiner* — Stephen F Husar
(74) *Attorney, Agent, or Firm* — Robert C. Montgomery; Montgomery Patent & Design

(57) ABSTRACT

A backlit storybook for the visually impaired comprises an audio and visual storybook including a book, a base, and an integral backlight. Each page of the book comprises images or words. The book is placed upon the base to enable each individual page to backlight the images and words to provide a high-contrast lighted character pattern easily readable by those with impaired vision. The system further includes a speaker for audio to play a corresponding narration and indicates when different pages should be turned.

13 Claims, 10 Drawing Sheets

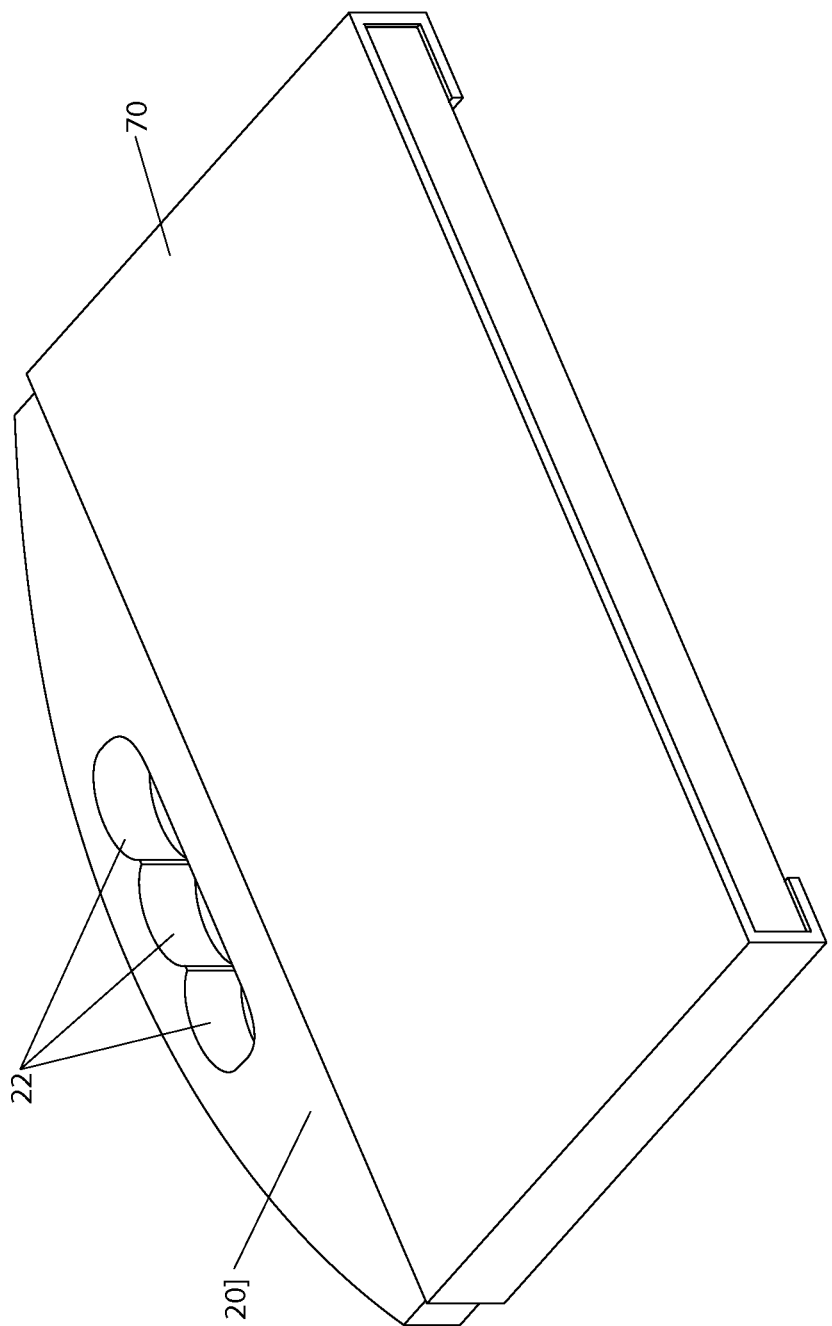

BACKLIT STORYBOOK FOR THE VISUALLY IMPAIRED

RELATED APPLICATIONS

There are currently no applications co-pending with the present application.

FIELD OF THE INVENTION

The present invention relates generally to electronic books, and in particular, to electronic books which illuminate for visually impaired persons.

BACKGROUND OF THE INVENTION

Storybooks have been known and enjoyed by people for many years. People who are visually impaired require the use of Braille or spoken word to understand books. Yet many people who have partial vision loss which enables them to see light perception utilize specialized tools to visually understand a storybook.

Various attempts have been made to provide storybooks for the visually impaired. Examples of these attempts can be seen by reference to several U.S. patents. U.S. Pat. No. 4,427,387, issued in the name of Tomita, describes a toy which assists in drawing.

U.S. Pat. No. 4,600,393, issued in the name of Rosenwinkel et al., describes a light box drawing toy.

U.S. Patent No. 2010/0277443, issued in the name of Yamazaki et al., describes an electronic book with flexible pages.

While these devices fulfill their respective, particular objectives, each of these references suffer from one (1) or more disadvantages. Many are not suited for interaction between user and device. Another problem is that many of the devices are not for reading or listening to a story. Accordingly, there exists a need for a storybook for the visually impaired without the disadvantages as described above. The development of the present invention substantially departs from the conventional solutions and in doing so fulfills this need.

SUMMARY OF THE INVENTION

The inventor has recognized the aforementioned inherent problems and lack in the art and observed that there is a need for storybooks for the visually impaired which provides a user interface and interaction between the visually impaired person and the device.

Accordingly, it is an object of the present embodiments of the invention to solve at least one (1) of these problems. The inventor has addressed this need by developing a storybook for the visually impaired.

To achieve the above objectives, it is an object of the present invention to provide a backlit story book which is suited for persons who are visually impaired.

Another object of the present invention is to provide a control base and at least one (1) book.

Yet still another object of the present invention is to retain the book mechanically and electrically and provide electronics to provide the audio and illumination of the book.

Yet still another object of the present invention is to provide the control base with a handle for grasping and transporting.

Yet still another object of the present invention is to provide a recess upon the control base for securing the book.

Yet still another object of the present invention is to provide the control base with a connection fitting to provide a mechanical and electrical connection to the book.

Yet still another object of the present invention is to provide the control base with control buttons and an illumination device to enable the book to animate.

Yet still another object of the present invention is to provide the book with embedded circuitry to enable narration of the book to be broadcasted by the control base.

Yet still another object of the present invention is to provide the book with a plurality of illuminated etches which outlined characters who correspond to the story and the audio.

Yet still another object of the present invention is to provide the book with illumination jacks and illumination devices to illuminate the book.

Yet still another object of the present invention is to provide the book with a binding, a front cover, a rear cover, and a plurality of pages.

Yet still another object of the present invention is to provide the binding with a microchip which retains information about the book which are transferred to the control base.

Yet still another object of the present invention is to provide the pages with fiber optics to illuminate each page.

Yet still another object of the present invention is to provide a cover to protect the control base.

Yet still another object of the present invention is to provide a method of utilizing the device that provides a unique means of engaging the binding of a book with the connection fitting on the control base, powering the system, illuminating each page, and looking and listening to the storybook.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
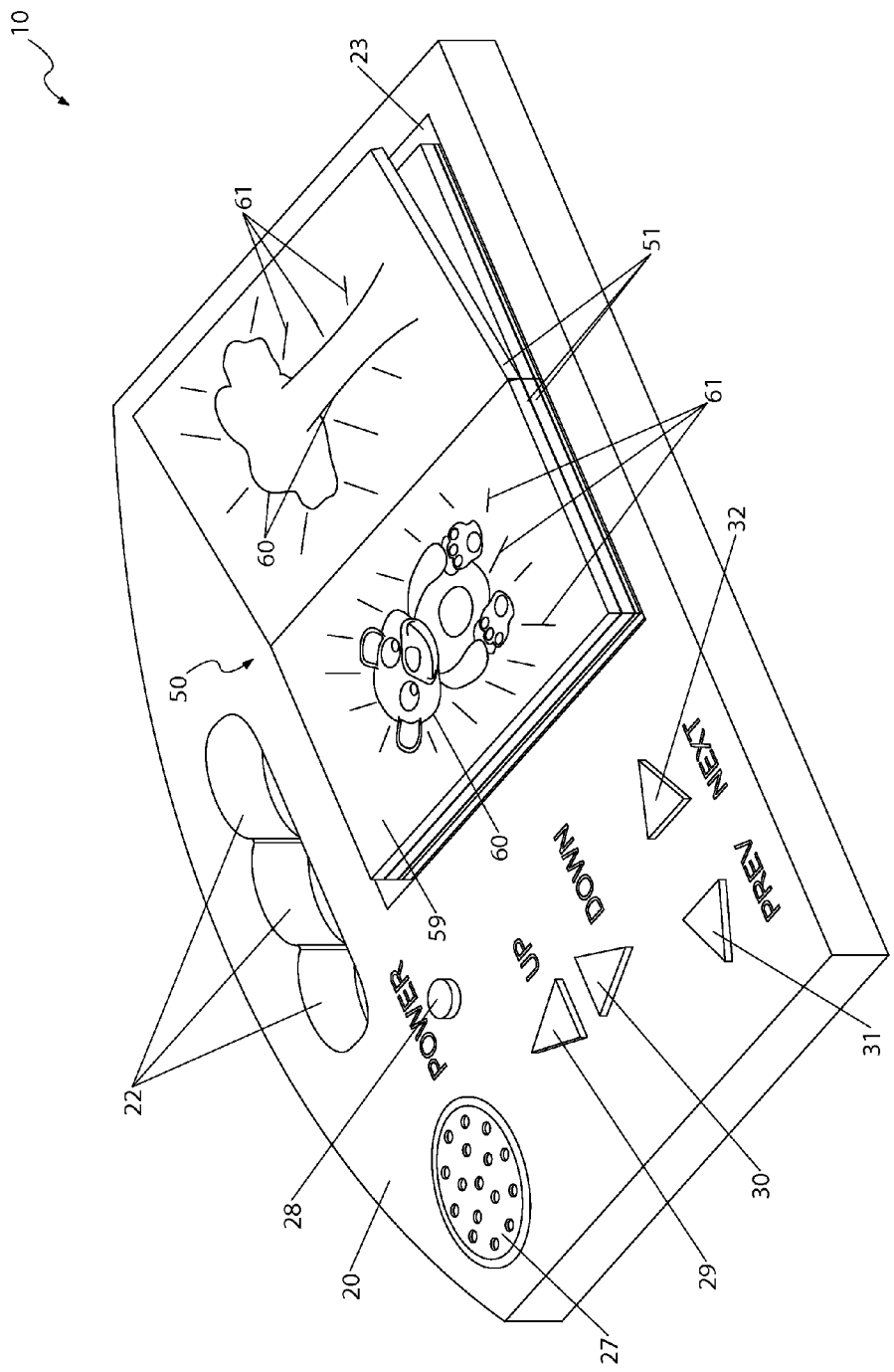
FIG. 1 is a perspective view of a backlit story book for the visually impaired 10, according to a preferred embodiment of the present invention.

DESCRIPTIVE KEY 10 backlit story book for the visually impaired
20 control base
22 handle
23 recess
24 slot
25 battery compartment
26 battery
27 speaker
28 activation button
29 volume increase button
30 volume decrease button
31 previous button
32 next button
33 microprocessor
34 first circuit
35 second circuit
36 illumination device
37 standoff
38 connection fitting
39 insertion port
40 USB port
41 cable
42 interior portion
50 book
51 binding
52 illumination jack
53 USB jack
54 microchip
55 fiber optic
56 front cover
57 rear cover
58 indicia
59 page
60 etch
61 illumination
62 front sheet
63 rear sheet
70 cover

DETAILED DESCRIPTION OF THE PREFERRED EMBODIMENT

The best mode for carrying out the invention is presented in terms of its preferred embodiment, herein depicted within FIGS. 1 through 10. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a backlit story book (herein described as the "system") 10, which provides a means for enhancing features of a book 50 particularly suited for persons who are visually impaired.

Referring now to FIG. 1, a perspective view of the system 10, according to the preferred embodiment of the present invention, is disclosed. The system 10 comprises a control base 20 and at least one (1) book 50. The control base 20 and the book 50 work together to provide a visually and audibly appealing means of reading a story. The control base 20 comprises control buttons 28, 29, 30, 31, 32 and an illumination device 36 to enable the book 50 to animate. Circuitry which is embedded within the book 50 enables narration of the book 50 to be broadcasted by the control base 20. The book 50 includes a plurality of etches 60 which correspond to a particular story and the audio. The etches 60 are illuminated to enable the visually impaired to see an outlined character which corresponds to the story and audio.

Figure 2:
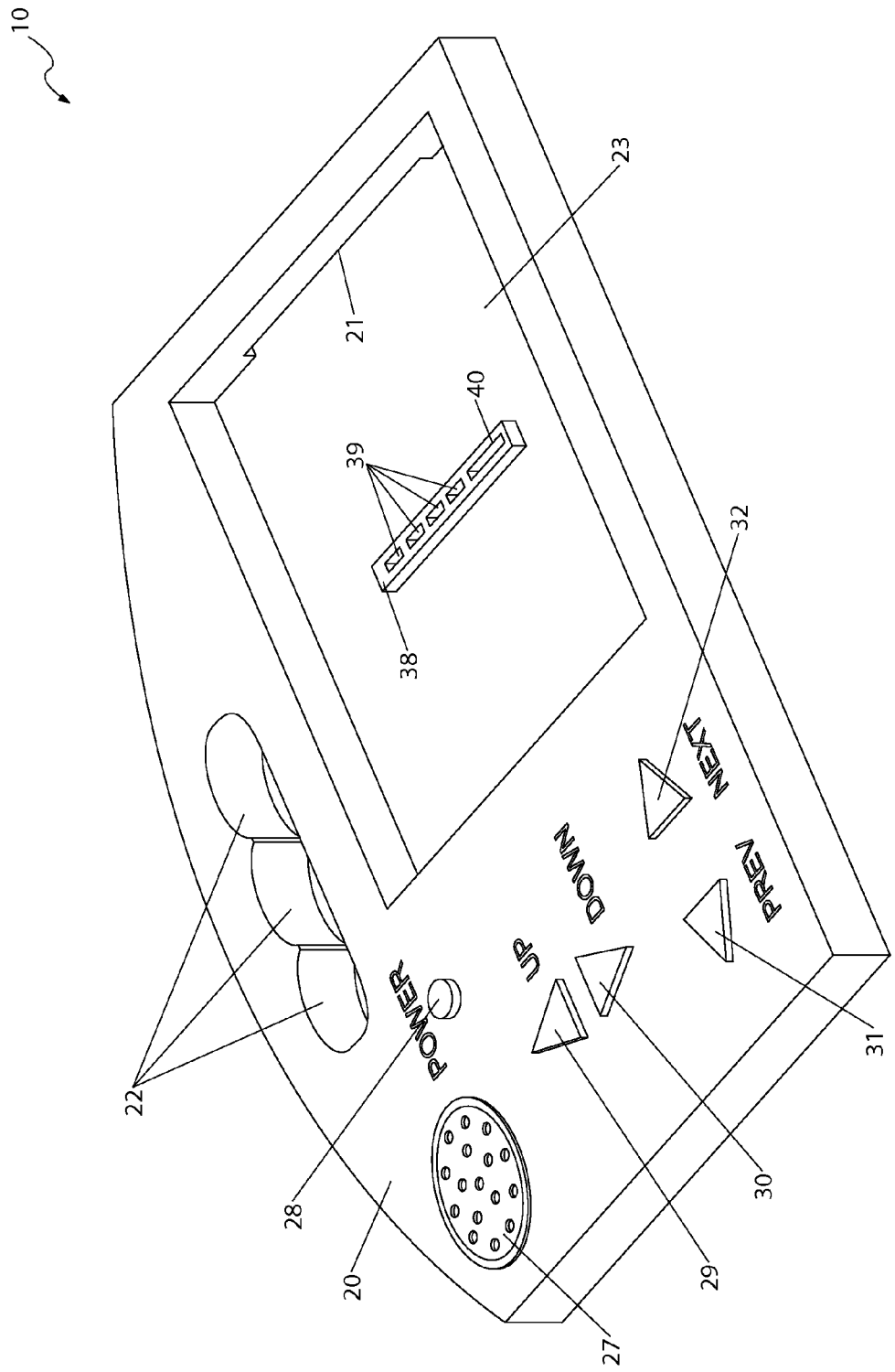
FIG. 2 is a front perspective view of a control base 20, according to a preferred embodiment of the present invention.
Figure 3:
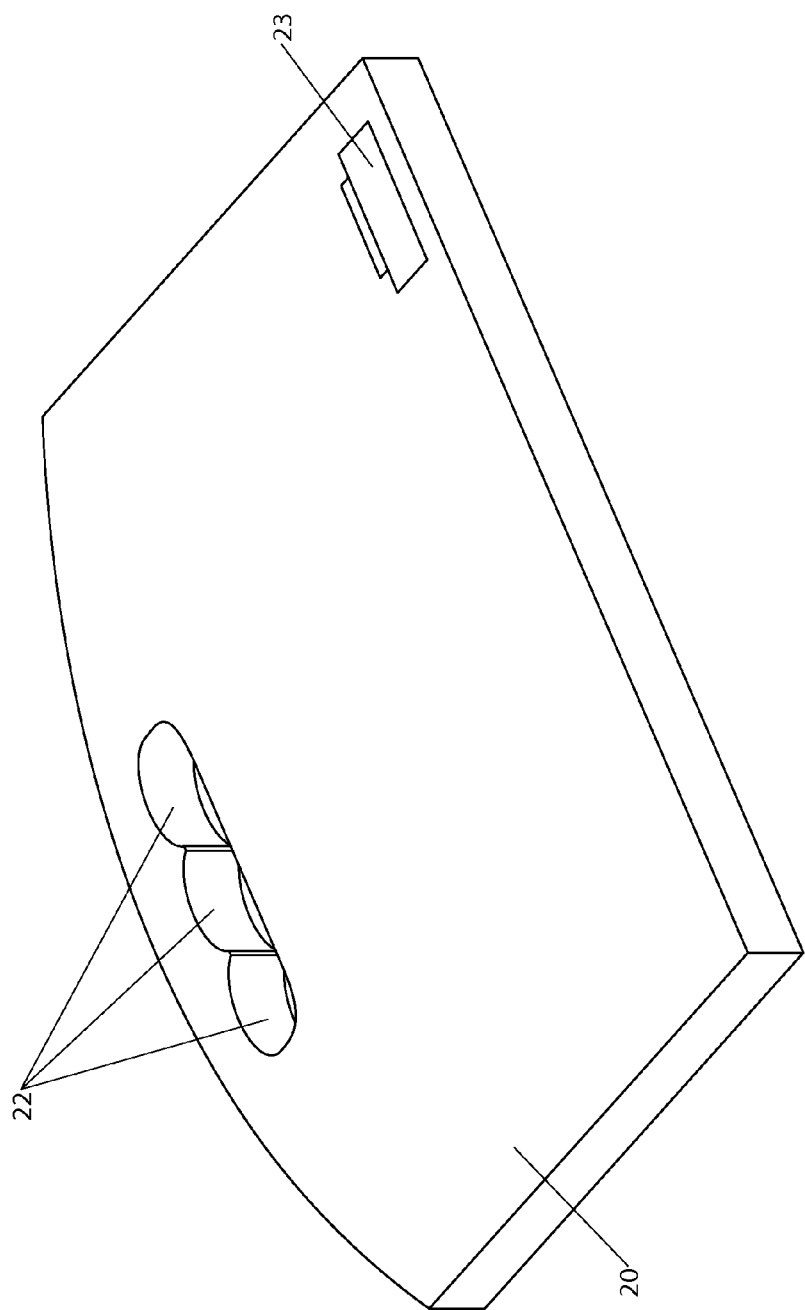
FIG. 3 is a rear perspective view of the control base 20, according to a preferred embodiment of the present invention.
Figure 4:
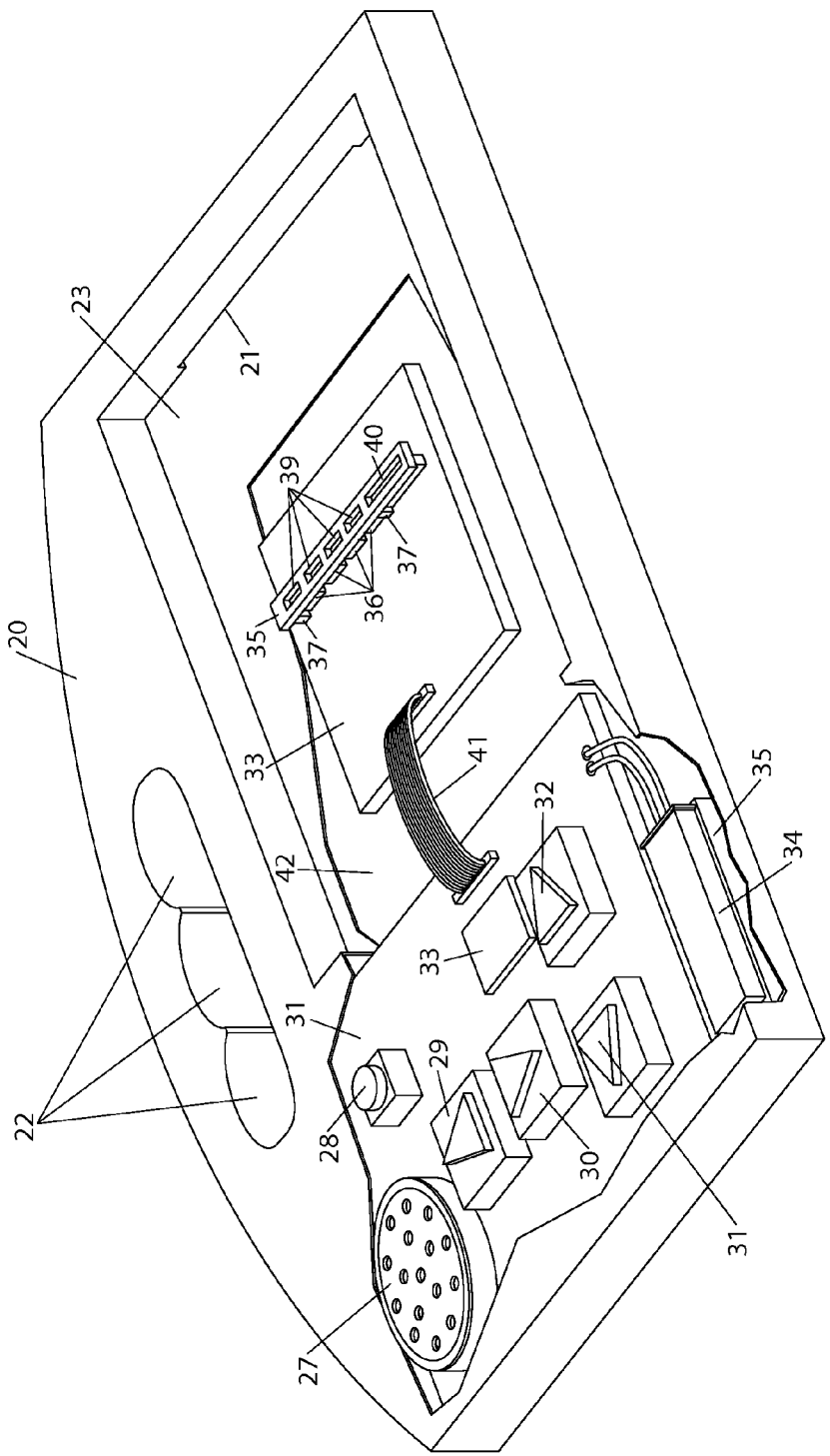
FIG. 4 is a front cut-away perspective view of the control base 20, according to a preferred embodiment of the present invention.

Referring now to FIG. 2, a front perspective view of the control base 20, FIG. 3, a rear perspective view of the control base 20, and FIG. 4, a front cut-away perspective view of the control base 20, according to the preferred embodiment of the present invention, are disclosed. The control base 20 includes a generally rectangular shape which is fabricated from a durable plastic. The control base 20 retains the book 50 mechanically and electrically and also provides electronics to provide the audio and illumination of the book 50.

An upper portion of the control base 20 includes an ergonomic handle 22 which enables a user to grasp for transporting the control base 20 to a desired location. The handle 22 is preferably molded into the control base 20 and can be positioned at various location as desired by the manufacturer. An upper surface of the control base 20 includes a rectangular recess 23 which provides a position for the book 50 to be electrically and mechanically secured. The recess 23 is slightly larger than the dimensions of an open book 50 and includes a slot 24 and a connection fitting 38. The slot 24 is depicted along a lateral inner edge of the recess 23. The slot 24 enables a rear cover 57 of the book 50 to be slid within to partially secure the book 50 via friction fit.

The connection fitting 38 provides a mechanical and electrical connection to the book 50. The connection fitting 38 includes a plurality of insertion ports 39 and a USB port 40. The connection fitting 38 is mounted to a second circuit board 35 housed within an interior portion 42 (see FIG. 4) with a pair of common standoffs 37. Each insertion port 39 provides a removably attachable attachment to a respective illumination jack 52 upon the book 50. The interconnection of the illumination jacks 52 to the insertion ports 39 further secure the book 50 to the control base 20. The insertion ports 39 align with an illumination device 36 which are positioned below the insertion ports 39 and fixed upon the second circuit 35. The illumination devices 36 are preferably light emitting diodes (LED's) and each illumination device 36 corresponds to a page 59 of the book 50; therefore, the number of pages 59 equals the number of illumination devices 36 and the number of insertion ports 39. The USB port 40 provides an electrical connection between the second circuit 35 and a USB jack 53 upon the book 50. The connection of the USB port 40 to the USB jack 53 enables data to be transferred from a microchip 54 within the book 50 to the second circuit 35, and further to a first circuit 34.

The interior portion 42 of the control base 20 encloses the circuits 34, 35 which are also interconnected with a common cable 41. The second circuit 35 transmits the data inserted into the USB port 40 to the first circuit 34 which enables user manipulation via a plurality of buttons 28, 29, 30, 31, 32. The data transferred is preferably narration of the respective story, illumination sequences and patterns, timing sequences, or the like. Each book 50 would possess particular data which corresponds to the story. The first circuit 34 includes a microprocessor 33 which controls the data input from the book 50 and controls the buttons 28, 29, 30, 31, 32. An activation button 28 activates and deactivates the current from a battery 26 to the circuits 34, 35. The battery 26 is preferably a user replaceable electrochemical cell located within a battery compartment 25 on a rear surface of the control base 20. A volume increase button 29 and a volume decrease button 30 manipulate the sound broadcasted from a speaker 27. The speaker 27 is a common electro-acoustic transducer which produces sound in response to the audio signal transferred from the book 50. The speaker 27 broadcasts the narration of the book 50 along with associated commands such as prompts to turn a page 59. A previous button 31 and a next button 32 increment or decrement the narration according to a desired page 59. The buttons 28, 29, 30, 31, 32 are preferably push-button switches, yet other switching devices may be utilized without limiting the scope of the system 10.

Figure 5:
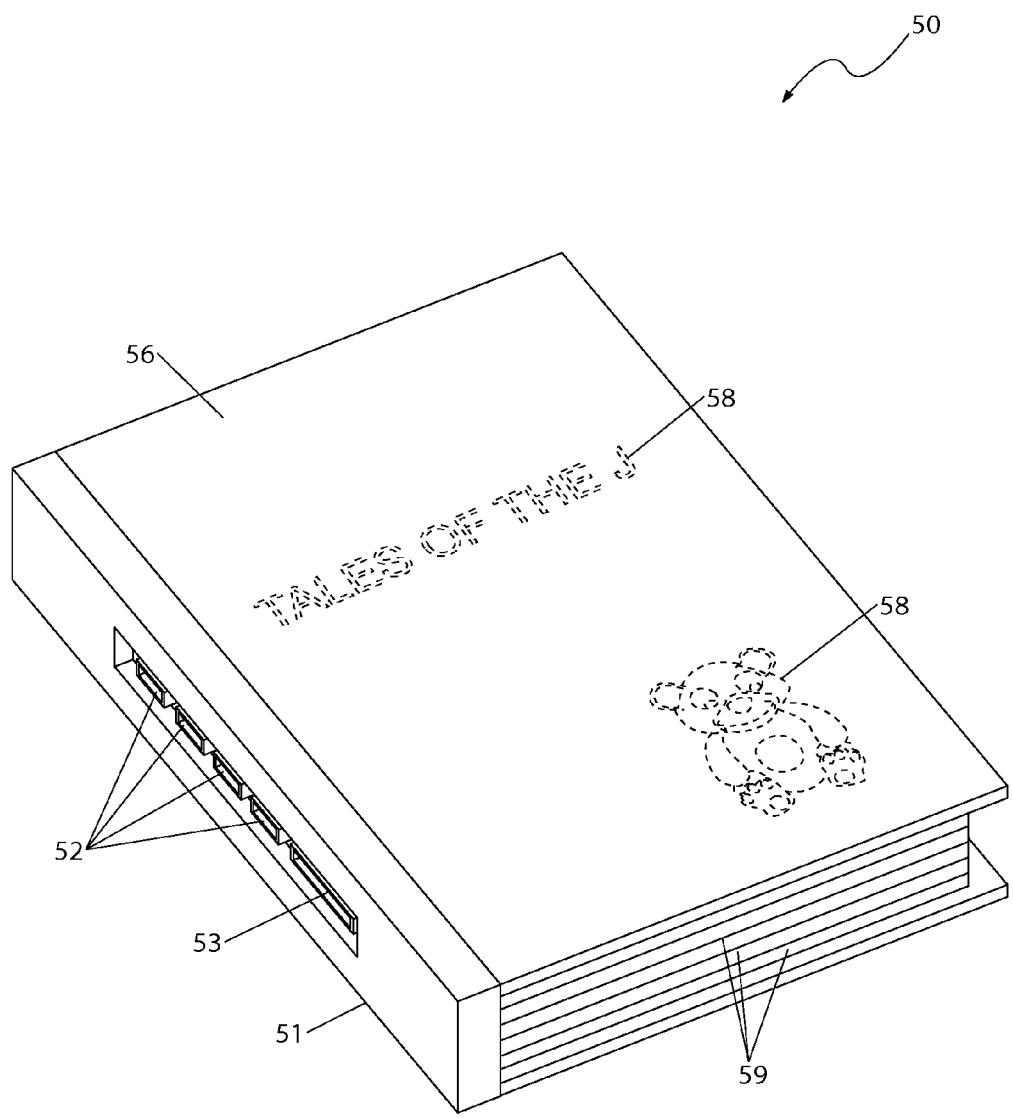
FIG. 5 is a front perspective view of a book 50, according to a preferred embodiment of the present invention.
Figure 6:
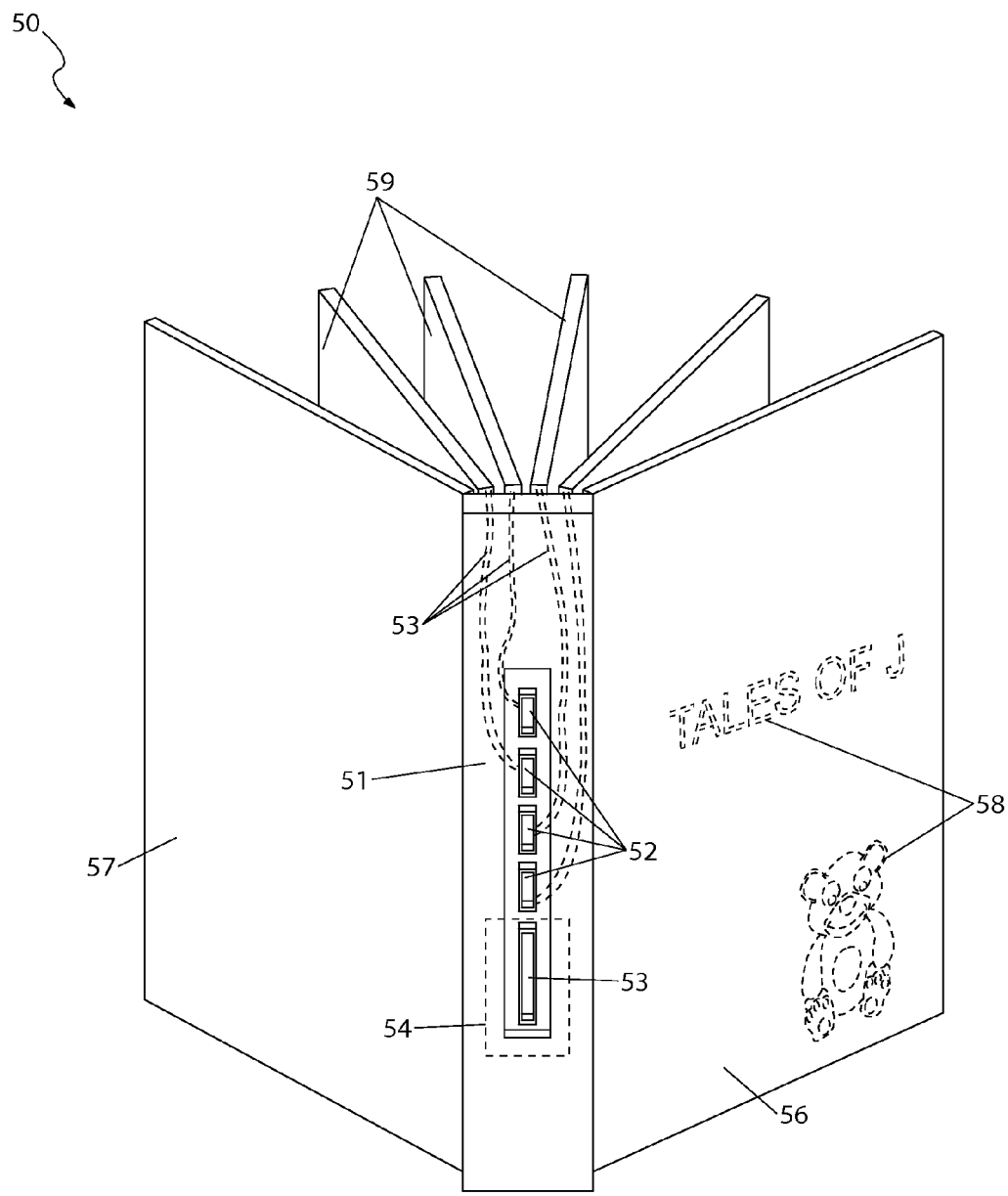
FIG. 6 is a rear open perspective view of the book 50, according to a preferred embodiment of the present invention.
Figure 7:
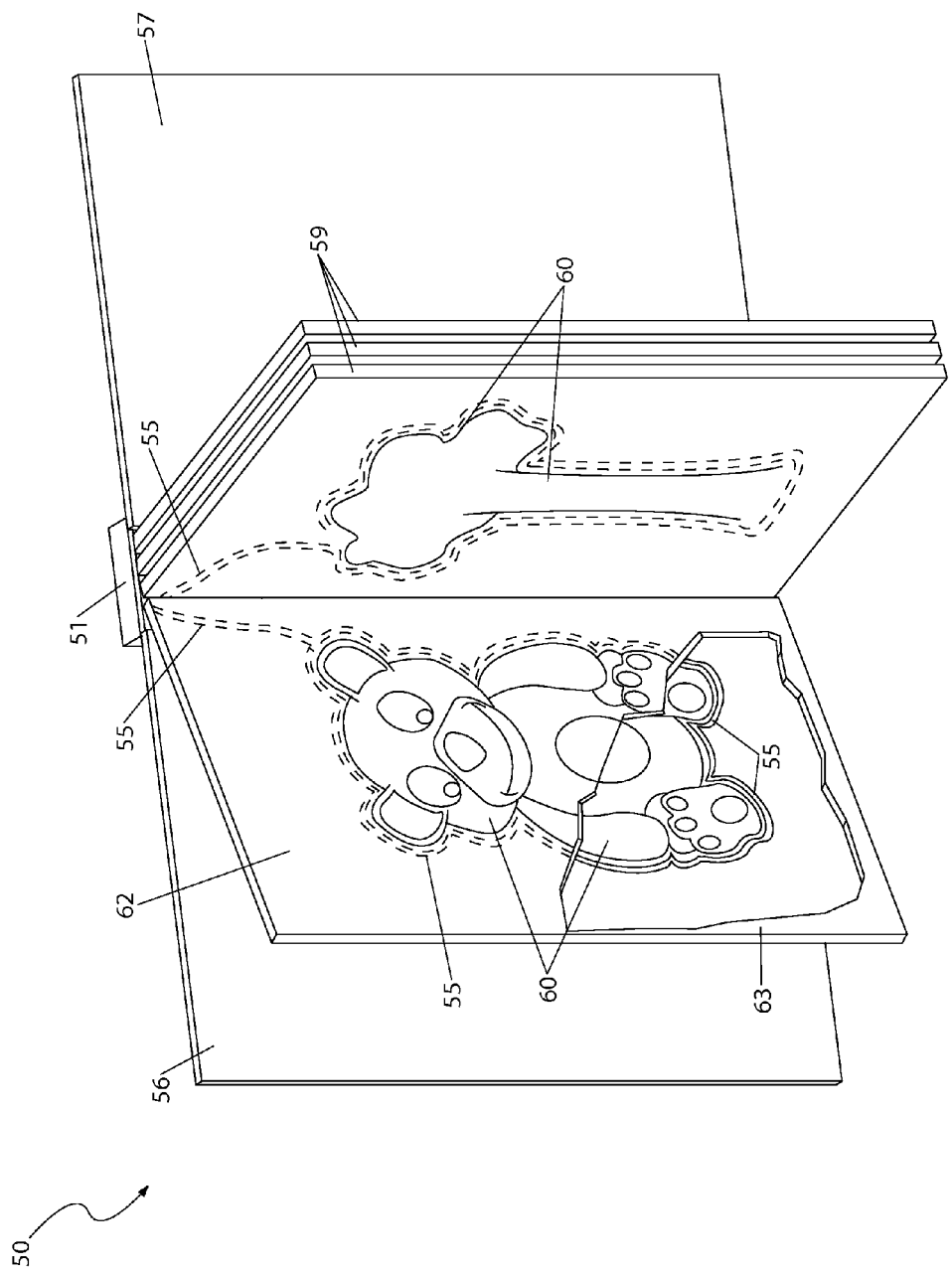
FIG. 7 is a front open perspective view of the book 50, according to a preferred embodiment of the present invention.

Referring now to FIG. 5, a front perspective view of the book 50, FIG. 6, a rear open perspective view of the book 50, and FIG. 7, a front open perspective view of the book 50, according to the preferred embodiment of the present invention, are disclosed. The book 50 works in conjunction with the control base 20. Preferably the system 10 would be purchased with a control base 20 and a couple books 50 and the option of the user to purchase different books 50 as desired. The books 50 are provided with common story themes found on the market today. In a closed position the book 50 measures approximately ten-and-a-half (10½) inches in length and eight (8) inches in width.

The book 50 includes a binding 51, a front cover 56, a rear cover 57, and a plurality of pages 59. The front cover 56 and rear cover 57 include indicia 58 such as titles, illustrations, book information, or the like and they also protect the pages 59. The covers 56, 57 and pages 59 are attached to the binding 51 with common book binding techniques and also electrically connected with a plurality of fiber optics 55 (see herein below). The book 50 is fabricated from materials such as a thick compressed and bonded paper in various colors, yet other materials such as vinyl or the like may be utilized without limiting the scope of the system 10. The binding 51 also includes a microchip 54 which retains information about the book 50, narration of the story, and other associated prompts which are transferred to the control base 20.

An outer intermediate portion of the binding 51 includes a plurality of illumination jacks 52 which interconnect with the insertion ports 39 and the USB jack 53 which interconnects to the USB port 40. The insertion ports 39 connected to the illumination jacks 52 are common fiber optic snap connectors and the USB jack 53 connected to the USB port 40 is a standard universal serial bus male to female sockets. Each illumination jack 52 is interconnected to a length of fiber optics 55 which are further routed to a desired page 59 (see herein below).

Each page 59 is comprised of a front sheet 62 and a rear sheet 63 which are bonded together with adhesive. The fiber optics 55 are positioned between the sheets 62, 63. Each sheet 62, 63 includes an etch 60 which corresponds to a silhouette of a character or object in the associated story. Each etch 60 is a through-hole cut through the entire page 59. The fiber optics 55 are positioned between each sheet 62, 63 along the perimeter edge of each etch 60 to enable the fiber optics 55 to create an illumination 61 and further enable the user to recognize the shape.

Figure 8:
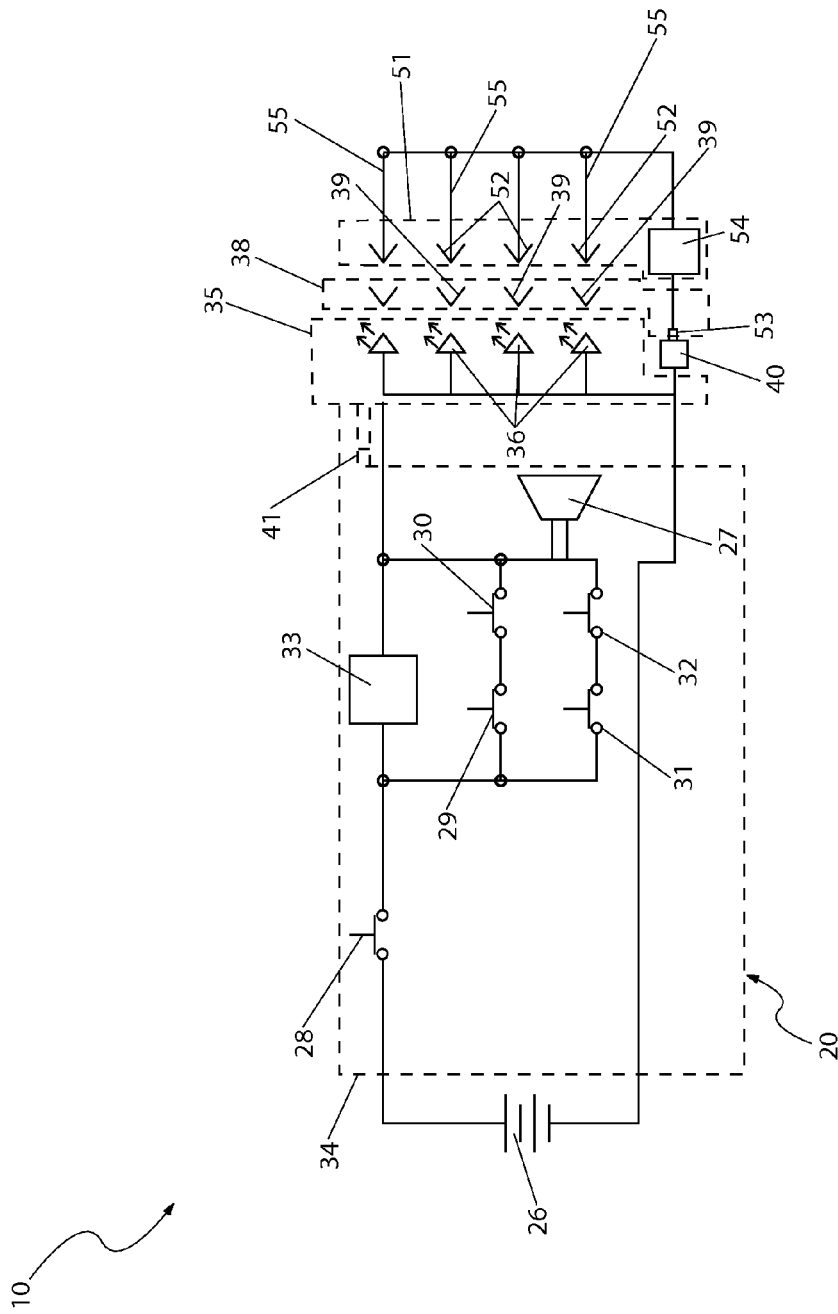
FIG. 8 is an electrical block diagram of the backlit story book for the visually impaired 10, according to a preferred embodiment of the present invention.

Referring now to FIG. 8, an electrical block diagram of the system 10, according to the preferred embodiment of the present invention, is disclosed. The control base 20 receives current from the battery 26. The battery 26 enables the activation button 28 to be depressed and simultaneously transmit current to the volume buttons 29, 30, previous and next buttons 31, 32, the speaker 27, the microprocessor 33, and illumination devices 36. With a binding 51 of a book 50 connected to the connection fitting 38 the illumination devices 36 transmit illumination 61 to each fiber optic 55 which illuminates the etches 60 on a single page 59. Current is also transmitted to the USB jack 53 and microchip 54 within the binding 51. The illumination of each fiber optic 55 is controlled by the microchip 54 which includes various setting and prompts to enable the fiber optics 55 to illuminate 61 at a desired time, particularly when the user is at the associated page 59. Preferably, the narration broadcasted through the speaker 27 will advise the user when to turn to the next page 59 which will activate the respective illumination device 36 and concurrently enable the respective fiber optic 55 to illuminate 61. The user can also depress the previous button 31 or next button 32 to change pages as desired.

Figure 9:
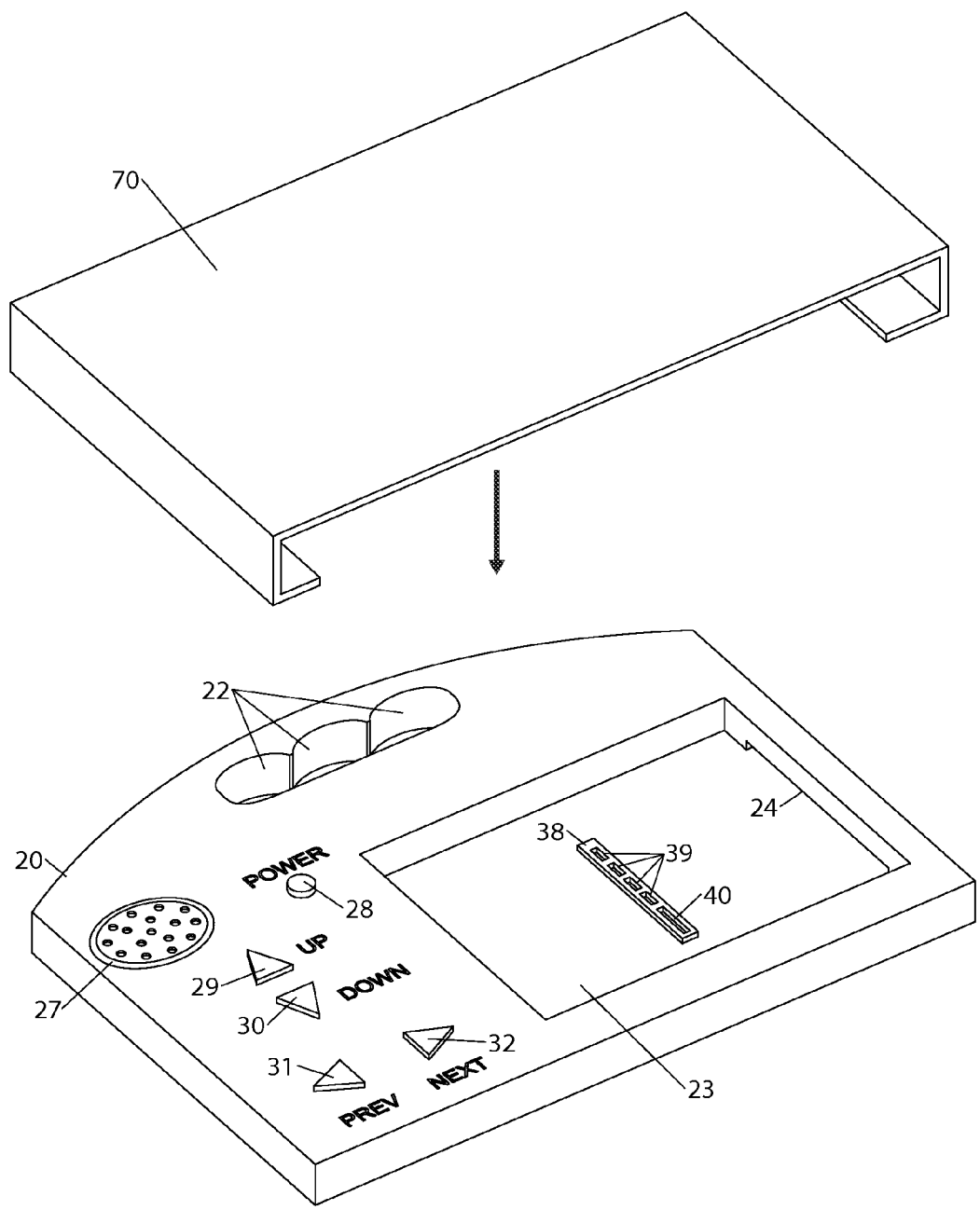
FIG. 9 is a front perspective view of the control base 20 and a cover 70, according to a preferred embodiment of the present invention; and, FIG. 10 is another front perspective view of the control base 20 depicting the cover 70 as being attached, according to a preferred embodiment of the present invention.

Referring now to FIG. 9, a front perspective view of the control base 20 and the cover 70 and FIG. 10, another front perspective view of the control base 20 depicting the cover 70 as being attached, according to the preferred embodiment of the present invention, are disclosed. A cover 70 is also provided with the system 10 to protect the control base 20 from water, debris, or the like during transportation or storage. The cover 70 is depicted as a "C"-shaped durable pliable plastic material which is placed upon the front surface of the control base 20 and partially upon the rear surface of the control base 20. The cover 70 is slightly larger than the width of the control base 20 to enable a sliding placement thereupon. It is known that other cover 70 attachment means can be utilized without limiting the scope of the system 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 1.

The method of installing and utilizing the system 10 may be achieved by performing the following steps: acquiring the system 10; positioning the control base 20 on a level surface; replacing batteries 26 within the battery compartment 25 as desired; engaging the binding 51 of a desired book 50 with the connection fitting 38; depressing the activation button 28 to power the system 10; listening to the narration broadcasted from the speaker 27 and looking at the illuminated 61 etches 60 on the pages 59 of the book 50; utilizing the buttons 29, 30, 31, 32 to increase the volume or go through the pages 59 as desired; placing the cover 70 upon the control base 20 as needed; and, allowing visually impaired children to enjoy a storybook regardless of their vision capability in a manner which is quick, easy, and effective.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A backlit story book for visually impaired users, said backlit story book comprising:
   a control base, comprising:
      a handle;
      a recess formed in an upper surface of said control base, including a slot formed along a lateral inner edge thereof, and a connection fitting attached to a bottom surface thereof, said connection fitting including a plurality of insertion ports and a USB port;
      a first circuit board housed within an interior portion thereof;
      a second circuit board housed within said interior portion thereof and electrically connected to said first circuit board as well as said connection fitting, respectively; and,
      a plurality of illumination devices fixed on said second circuit board and communicatively aligned with said illumination ports; and,
   a book positioned within said recess of said control base, said book including a binding having a plurality of illumination jacks and a USB jack, a front cover, a rear cover, a plurality of pages and a story displayed on said pages;
   wherein a portion of said rear cover of said book is slidably and frictionally fit within said slot;
   wherein said connection fitting is mechanically and electrically connected to said binding of said book;
   wherein each of said illumination devices corresponds to one of said pages of said book;
   wherein a quantity of said pages of said book equals a quantity of said illumination devices as well as a quantity of said insertion points respectively;
   wherein said illumination jacks and said USB jack are electrically connected to said USB port and said insertion ports, respectively, when said book is placed within said recess; and,
   wherein illumination sequence data as well as narrative and instructional data is transferred from said control base to said book via said USB jack and said USB port.

2. The backlit story book of claim 1, wherein said first circuit board comprises a plurality of buttons extending upwardly through an upper surface of said control base;
   wherein said buttons control an operating mode of said book.

3. The backlit story book of claim 1, wherein said binding comprises a microchip containing illumination, audio and instructional information about stories contained within said book.

4. The backlit story book of claim 1, wherein said illumination jacks and said USB jack are located at said binding.

5. The backlit story book of claim 1, wherein each of said pages of said book comprises:
   a front sheet and a rear sheet bonded thereto;
   a plurality of fiber optics positioned between said front and rear sheets; and,
   an etch corresponding to a silhouette of an object in said story, wherein said etch is a through-hole cut through said pages, wherein said fiber optics are positioned along a perimeter edge of said etch and thereby illuminate a shape of said etch.

6. The backlit story book of claim 1, further comprising: a cover removably placed upon a front surface of said control base and partially upon said a rear surface of said control base.

7. A backlit story book for visually impaired users, said backlit story book comprising:
   a portable hand-held control base, comprising:
      a handle;
      a recess formed in an upper surface of said control base, including a slot formed along a lateral inner edge thereof, and a connection fitting attached to a bottom surface thereof, said connection fitting including a plurality of insertion ports and a USB port;
      a first circuit board housed within an interior portion thereof;
      a second circuit board housed within said interior portion thereof and electrically connected to said first circuit board as well as said connection fitting, respectively; and,
      a plurality of illumination devices fixed on said second circuit board and communicatively aligned with said illumination ports; and,
   a book positioned within said recess of said control base, said book including a binding having a plurality of illumination jacks and a USB jack, a front cover, a rear cover, a plurality of pages and a story displayed on said pages;
   wherein a portion of said rear cover of said book is slidably and frictionally fit within said slot;
   wherein said connection fitting is mechanically and electrically connected to said binding of said book;
   wherein each of said illumination devices corresponds to one of said pages of said book;
   wherein a quantity of said pages of said book equals a quantity of said illumination devices as well as a quantity of said insertion points respectively;
   wherein said illumination jacks and said USB jack are electrically connected to said USB port and said insertion ports, respectively, when said book is placed within said recess; and,
   wherein illumination sequence data as well as narrative and instructional data is transferred from said control base to said book via said USB jack and said USB port.

8. The backlit story book of claim 7, wherein said first circuit board comprises a plurality of buttons extending upwardly through an upper surface of said control base;
   wherein said buttons control an operating mode of said book.

9. The backlit story book of claim 7, wherein said binding comprises a microchip containing illumination, audio and instructional information about stories contained within said book.

10. The backlit story book of claim 7, wherein said illumination jacks and said USB jack are located at said binding.

11. The backlit story book of claim 7, wherein each of said pages of said book comprises:
    a front sheet and a rear sheet bonded thereto;
    a plurality of fiber optics positioned between said front and rear sheets; and,
    an etch corresponding to a silhouette of an object in said story, wherein said etch is a through-hole cut through said pages, wherein said fiber optics are positioned along a perimeter edge of said etch and thereby illuminate a shape of said etch.

12. The backlit story book of claim 7, further comprising: a cover removably placed upon a front surface of said control base and partially upon said a rear surface of said control base.

13. A method for utilizing a backlit story book for visually impaired users, said method comprising the steps of:
    providing a portable hand-held control base, comprising:
       a handle;

a recess formed in an upper surface of said control base, including a slot formed along a lateral inner edge thereof, and a connection fitting attached to a bottom surface thereof, said connection fitting including a plurality of insertion ports and a USB port;

a first circuit board housed within an interior portion thereof;

a second circuit board housed within said interior portion thereof and electrically connected to said first circuit board as well as said connection fitting, respectively; and, a plurality of illumination devices fixed on said second circuit board and communicatively aligned with said illumination ports;

providing and communicatively coupling a book positioned within said recess to said control base, said book including a binding having a plurality of illumination jacks and a USB jack, a front cover, a rear cover, a plurality of pages and a story displayed on said pages; and, said control base instructing the user to sequentially turn said pages and thereby automatically illuminating said pages while narrating said story displayed on said pages, wherein:

said connection fitting is mechanically and electrically connected to said binding of said book;

each of said illumination devices corresponds to one of said pages of said book;

a quantity of said pages of said book equals a quantity of said illumination devices as well as a quantity of said insertion points respectively;

said illumination jacks and said USB jack are electrically connected to said USB port and said insertion ports, respectively, when said book is placed within said recess; and, illumination sequence data as well as narrative and instructional data is transferred from said control base to said book via said USB jack and said USB port.

* * * * *